United States Patent
Fitch et al.

(10) Patent No.: US 12,072,696 B2
(45) Date of Patent: Aug. 27, 2024

(54) REDUCING CORROSION IN AN INFORMATION HANDLING SYSTEM

(71) Applicant: Dell Products L.P., Round Rock, TX (US)

(72) Inventors: Jon T. Fitch, Austin, TX (US); Sandor T. Farkas, Round Rock, TX (US); Joseph D. King, Georgetown, TX (US); Steven T. Embleton, Austin, TX (US)

(73) Assignee: Dell Products L.P., Round Rock, TX (US)

(*) Notice: Subject to any disclaimer, the term of this patent is extended or adjusted under 35 U.S.C. 154(b) by 686 days.

(21) Appl. No.: 17/226,364

(22) Filed: Apr. 9, 2021

(65) Prior Publication Data

US 2022/0326747 A1 Oct. 13, 2022

(51) Int. Cl.
G05B 23/02 (2006.01)

(52) U.S. Cl.
CPC .............................. G05B 23/0283 (2013.01)

(58) Field of Classification Search
CPC ............ G05B 23/0283; G05B 23/0286; G06Q 10/0635
See application file for complete search history.

(56) References Cited

U.S. PATENT DOCUMENTS

| | | | | |
|---|---|---|---|---|
| 2009/0177334 | A1* | 7/2009 | Artman | G06F 1/206 713/340 |
| 2012/0111190 | A1* | 5/2012 | Dariavach | B01D 53/30 96/397 |
| 2013/0265064 | A1* | 10/2013 | Hamann | G01N 17/04 324/700 |
| 2016/0313747 | A1* | 10/2016 | Meijer | B01D 53/261 |
| 2017/0350807 | A1* | 12/2017 | Minamitani | F24F 11/52 |
| 2018/0089042 | A1* | 3/2018 | Demetriou | G06Q 10/0631 |
| 2020/0152241 | A1* | 5/2020 | Nave | G11B 33/1406 |

* cited by examiner

Primary Examiner — Christopher W Carter
(74) Attorney, Agent, or Firm — McDermott Will & Emery LLP

(57) ABSTRACT

In one embodiment, a method for reducing corrosion in an information handling system includes receiving a system setting indicating one or more operation modes; identifying an ambient temperature of the information handling system, the ambient temperature captured by one or more sensors of the information handling system; identifying a humidity level of the information handling system, the humidity level captured by the one or more sensors; identifying a corrosion risk value based on the ambient temperature and the humidity level; determining that the corrosion risk value is greater than a threshold corrosion risk value; and in response to determining that the corrosion risk value is greater than the threshold corrosion risk value: modifying one or more device threshold settings based on the system setting and the corrosion risk value, wherein modifying the one or more device threshold settings causes the ambient temperature to increase and the humidity level to decrease.

20 Claims, 5 Drawing Sheets

REDUCING CORROSION IN AN INFORMATION HANDLING SYSTEM

BACKGROUND

Field of the Disclosure

The disclosure relates generally to information handling systems, and in particular to reducing corrosion in an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a method for reducing corrosion in an information handling system includes: receiving, by a corrosion manager of the information handling system, a system setting indicating one or more operation modes; identifying, by the corrosion manager, an ambient temperature of the information handling system, the ambient temperature captured by one or more sensors of the information handling system; identifying, by the corrosion manager, a humidity level of the information handling system, the humidity level captured by the one or more sensors; identifying, by the corrosion manager, a corrosion risk value based on the ambient temperature and the humidity level; determining, by the corrosion manager, that the corrosion risk value is greater than a threshold corrosion risk value; and in response to determining that the corrosion risk value is greater than the threshold corrosion risk value: modifying, by the corrosion manager, one or more device threshold settings based on the system setting and the corrosion risk value, wherein modifying the one or more device threshold settings causes the ambient temperature to increase and the humidity level to decrease.

In one or more of the disclosed embodiments, identifying the corrosion risk value based on the ambient temperature and the humidity level includes: accessing, by the corrosion manager, a corrosion database storing a plurality of corrosion risk values, each of the plurality of corrosion risk values comprised of an ambient temperature and humidity level pair; and selecting, by the corrosion manager, the corrosion risk value from the plurality of corrosion risk values based on the ambient temperature and the humidity level.

In one or more of the disclosed embodiments, modifying the one or more device threshold settings based on the system setting and the corrosion risk value includes: causing, by the corrosion manager, a fan speed threshold to decrease, the decreased fan speed threshold causing a fan speed of one or more fans of the information handling system to increase.

In one or more of the disclosed embodiments, the method further includes: causing, by the corrosion manager, a direction of rotation for each of the one or more fans to reverse in direction.

In one or more of the disclosed embodiments, modifying the one or more device threshold settings based on the system setting and the corrosion risk value includes: causing, by the corrosion manager, a device throttle threshold to increase, the increased device throttle threshold causing an operating temperature of a device of the information handling system to increase.

In one or more of the disclosed embodiments, modifying the one or more device threshold settings based on the system setting and the corrosion risk value includes: causing, by the corrosion manager, a heater control threshold to decrease, the decreased heater control threshold causing a temperature of a heater of the information handling system to increase.

In one or more of the disclosed embodiments, the one or more operation modes includes: a performance operation mode configured to increase a performance of the information handling system; a power operation mode configured to decrease a power consumption of the information handling system; and a lifetime operation mode configured to increase a lifecycle of the information handling system.

In one or more of the disclosed embodiments, the system setting indicating one or more operation modes is received from a management backend via a network, the management backend including a user interface configured to receive the one or more operation modes from a user of the management backend.

In one or more of the disclosed embodiments, the method further includes: sending, by the corrosion manager, a signal to the management backend via the network, the signal indicating that the humidity level is above the threshold humidity level.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
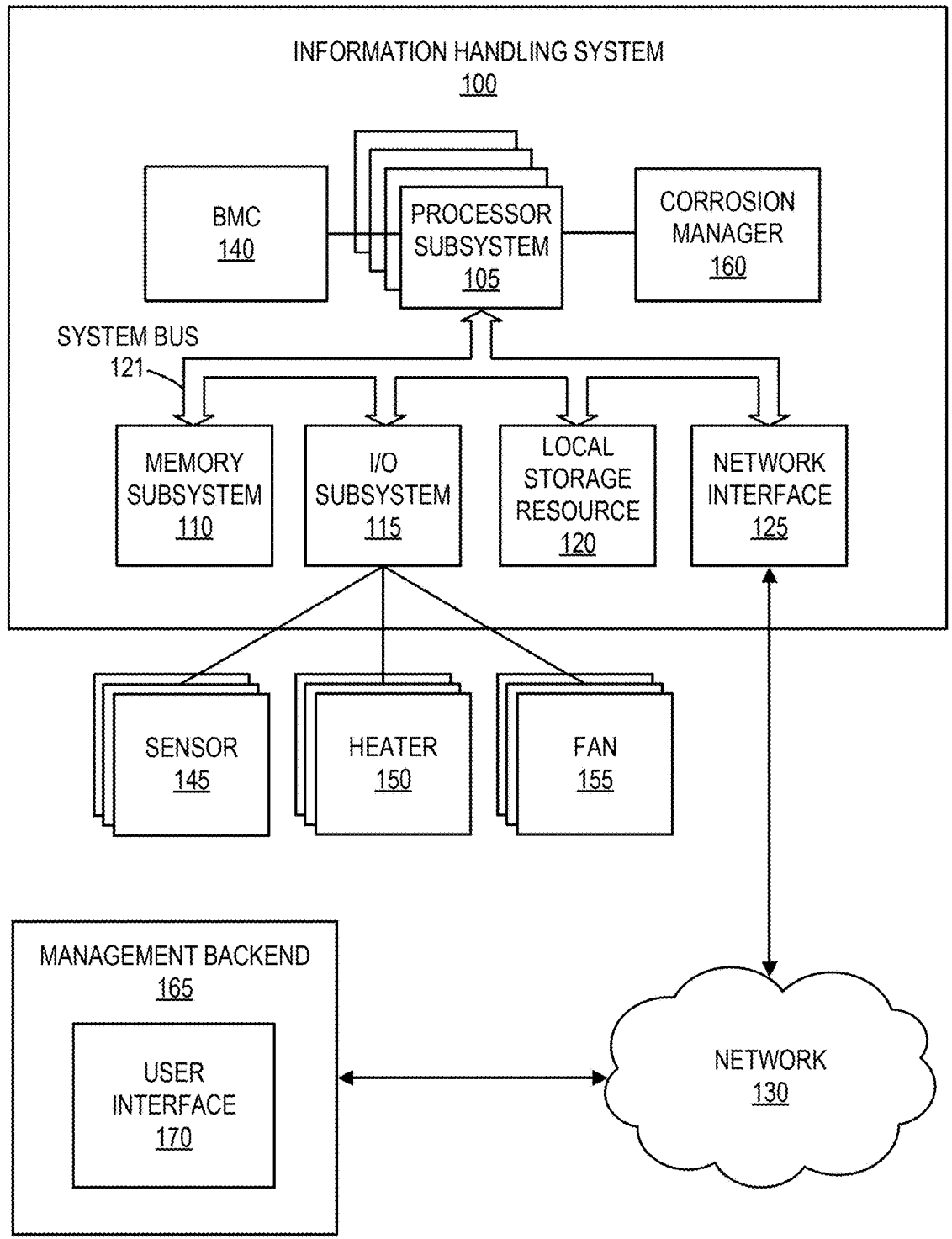
FIG. 1 is a block diagram of selected elements of an embodiment of a computing environment that includes an information handling system and a management backend.

This document describes a method for reducing corrosion in an information handling system that includes: receiving, by a corrosion manager of the information handling system, a system setting indicating one or more operation modes; identifying, by the corrosion manager, an ambient temperature of the information handling system, the ambient temperature captured by one or more sensors of the information handling system; identifying, by the corrosion manager, a humidity level of the information handling system, the humidity level captured by the one or more sensors; identifying, by the corrosion manager, a corrosion risk value based on the ambient temperature and the humidity level; determining, by the corrosion manager, that the corrosion risk value is greater than a threshold corrosion risk value; and in response to determining that the corrosion risk value is greater than the threshold corrosion risk value: modifying, by the corrosion manager, one or more device threshold settings based on the system setting and the corrosion risk value, wherein modifying the one or more device threshold settings causes the ambient temperature to increase and the humidity level to decrease.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 is a block diagram of selected elements of an embodiment of a computing environment that includes an information handling system and a management backend. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 105, which may comprise one or more processors, and system bus 121 that communicatively couples various system components to processor subsystem 105 including, for example, a memory subsystem 110, an I/O subsystem 115, a local storage resource 120, and a network interface 125. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. As shown in FIG. 1, information handling system 100 may additionally include a baseboard management controller (BMC) 140, one or more sensors 145, one or more heaters 150, one or more fans 155, and a corrosion manager 160.

In information handling system 100, processor subsystem 105 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 105 may interpret and/or execute program instructions and/or process data stored locally (e.g., in memory subsystem 110 and/or another component of information handling system 100). In the same or alternative embodiments, processor subsystem 105 may interpret and/or execute program instructions and/or process data stored remotely. In one embodiment, processor subsystem 105 may be or include a multi-core processor comprised of one or more central processing units (CPUs) disposed upon an integrated circuit (IC) chip. In other embodiments, processor subsystem 105 may be or include an integrated device (e.g., microcontroller, system on a chip (SoC), and the like) that includes memory, peripheral interfaces, and/or other components suitable for interpreting and/or executing program instructions and/or processing data.

In one embodiment, memory subsystem 110 may comprise a system, device, or apparatus operable to retain and/or retrieve program instructions and/or data for a period of time (e.g., computer-readable media). Memory subsystem 110 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 115 may comprise a system, device, or apparatus generally operable to receive and/or transmit data to, from, and/or within information handling system 100. I/O subsystem 115 may represent, for example, a variety of communication interfaces, graphics interfaces, video interfaces, user input interfaces, and/or peripheral interfaces. In various embodiments, I/O subsystem 115 may be used to support various peripheral devices, such as a touch panel, a display adapter, a keyboard, an accelerometer, a touch pad, a gyroscope, an IR sensor, a microphone, a sensor, a camera, or another type of peripheral device. In the embodiment illustrated in FIG. 1, I/O subsystem 115 may be communicably coupled to one or more sensors 145, one or more heaters 150, and/or one or more fans 155.

In one embodiment, local storage resource 120 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In one embodiment, network interface 125 may be a suitable system, apparatus, or device operable to serve as an interface between information handling system 100 and a network 130. Network interface 125 may enable information handling system 100 to communicate over network 130 using a suitable transmission protocol and/or standard, including, but not limited to, transmission protocols and/or standards enumerated below with respect to the discussion of network 130. Network 130 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 125 may enable wired and/or wireless communications (e.g., NFC or Bluetooth) to and/or from information handling system 100.

In particular embodiments, network 130 may include one or more routers for routing data between client information handling systems 100 and server information handling systems 100. A device (e.g., a client information handling system 100 or a server information handling system 100) on network 130 may be addressed by a corresponding network address including, for example, an Internet protocol (IP) address, an Internet name, a Windows Internet name service (WINS) name, a domain name or other system name. In particular embodiments, network 130 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 130 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 130 and its various components may be implemented using hardware, software, or any combination thereof.

In one embodiment, BMC 140 may be a suitable system, apparatus, or device operable to monitor a physical state of information handling system 100. In particular, BMC 140 may be or include an electronic hardware device that uses information captured by one or more sensors 145 to monitor physical parameters of information handling system 100 (e.g., power supply voltage, fan speed, humidity, ambient temperature, and the like). In one embodiment, BMC 140 may additionally include circuitry (e.g., processor, memory, network interface, and the like) that allows BMC 140 to communicate with one or more additional information handling systems and/or an administrator of computing environment 135. For example, BMC 140 may notify an administrator of computing environment 135 of events in which physical parameters of information handling system 100 are above or below permissible limits. In this example, BMC 140 may additionally log such events for error analysis.

In one embodiment, BMC 140 may communicate with a remote access controller (e.g., a Dell Remote Access Controller (DRAC), an integrated Dell Remote Access Controller (iDRAC), and the like) external to, or integrated into, information handling system 100. For example, one or more additional information handling systems of computing environment 135 may each include a remote access controller used to interface with BMC 140 to perform a management information exchange with information handling system 100. In one embodiment, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one embodiment, BMC 140 may be or include a microcontroller. For example, BMC 140 may be or include an 8051 microcontroller, an ARM Cortex-M (e.g., Cortex-M0, Cortex-M1, Cortex-M3, Cortex-M4, Cortex-M7, and the like) microcontroller, a MSP430 microcontroller, an AVR (e.g., 8-bit AVR, AVR-32, and the like) microcontroller, a PIC microcontroller, a 68HC11 microcontroller, a ColdFire microcontroller, a Renesas microcontroller, etc. In other embodiments, BMC 140 may be or include an application processor, a field programmable gate array (FPGA), ASIC, and/or any integrated circuit suitable for monitoring a physical state of information handling system 100.

In one embodiment, each sensor 145 (collectively referred to herein as "sensors 145") may be a suitable system, apparatus, or device operable to capture information associated with information handling system 100. In particular, sensors 145 may be disposed throughout information handling system 100 and/or computing environment 135 such that sensors 145 may capture environmental information associated with physical parameters of information handling system 100 (e.g., humidity level, ambient temperature, corrosion level, and the like). In one embodiment, sensors 145 may be or include one or more humidity sensors, temperature sensors, and/or corrosion sensors operable to, both, capture environmental information associated with information handling system 100 and to transmit the captured environmental information to one or more devices of information handling system 100 for analysis. In other embodiments, sensors 145 may be or include one or more motion sensors, power failure sensors, voltage sensors, current sensors, smoke sensors, and/or any combination of sensors suitable for capturing information associated with information handling system 100.

In one embodiment, sensors 145 may be or include one or more humidity sensors operable to measure an amount of water vapor, or a "humidity level," present in information handling system 100. In this embodiment, sensors 145 may capture the humidity level of information handling system 100 and may transmit the captured humidity level to one or more devices of information handling system 100 for analysis. For example, sensors 145 may be or include one or more hygrometers operable to capture a humidity level present within one or more chassis and/or devices of information handling system 100 and to transmit the captured humidity level to BMC 140. BMC 140 may monitor the humidity level of information handling system 100 and may provide the humidity level captured by sensors 145 to corrosion manager 160. Corrosion manager 160 may modify device threshold settings (e.g., device threshold settings 245 shown in FIG. 2) based, in part, on the humidity level to cause the ambient temperature of information handling system 100 to increase and/or decrease accordingly. In another embodiment, sensors 145 may transmit the captured humidity level directly to corrosion manager 160. In one embodiment, corrosion manager 160 may send a signal (e.g., corrosion alert 260 shown in FIG. 2) in response to the humidity level captured by sensors 145 reaching, or exceeding, a threshold humidity level (e.g., corrosion alert threshold 245-C). For example, corrosion manager 160 may send a signal to management backend 165 indicating that the humidity level is above a threshold humidity level.

In one embodiment, sensors 145 may be or include one or more temperature sensors operable to measure a temperature of the air, or an "ambient temperature," present in information handling system 100. In this embodiment, sensors 145 may capture the ambient temperature of information handling system 100 and may transmit the captured ambient temperature to one or more devices of information handling system 100 for analysis. For example, sensors 145 may be or include one or more thermometers and/or ambient temperature sensors operable to capture an ambient temperature present within one or more chassis and/or devices of information handling system 100 and to transmit the captured ambient temperature to BMC 140. BMC 140 may monitor the ambient temperature of information handling system 100 and may provide the ambient temperature captured by sensors 145 to corrosion manager 160. Corrosion manager 160 may modify device threshold settings (e.g., device threshold settings 245 shown in FIG. 2) based, in part, on the ambient temperature to cause the ambient temperature of information handling system 100 to increase and/or decrease accordingly. In another embodiment, sensors 145 may transmit the captured ambient temperature directly to corrosion manager 160.

In one embodiment, sensors 145 may be or include one or more corrosion sensors operable to measure a rate of corrosion, or a "corrosion level," present in information handling system 100. In this embodiment, sensors 145 may capture the corrosion level of information handling system 100 and may transmit the captured corrosion level to one or more devices of information handling system 100 for analysis. For example, sensors 145 may be or include one or more corrosion sensors operable to capture a corrosion level present within one or more printed circuit boards (PCBs) and/or devices within, or communicably coupled to, information handling system 100 and to transmit the captured corrosion level to BMC 140. BMC 140 may monitor the corrosion level of information handling system 100 and may provide the corrosion level captured by sensors 145 to corrosion manager 160. Corrosion manager 160 may modify device threshold settings (e.g., device threshold settings 245 shown in FIG. 2) based, in part, on the corrosion level to cause the ambient temperature of information handling system 100 to increase and/or decrease accordingly. In another embodiment, sensors 145 may transmit the captured corrosion level directly to corrosion manager 160. Sensors 145 are described in further detail with respect to FIG. 2.

In one embodiment, each heater 150 (collectively referred to herein as "heaters 150") may be a suitable system, apparatus, or device operable to increase an ambient temperature of information handling system 100 and/or computing environment 135. Specifically, heaters 150 may be disposed throughout information handling system 100 and/or computing environment 135 such that heaters 150 may be activated, or otherwise placed in an on state, to increase an ambient temperature of information handling system 100. This increase in ambient temperature of information handling system 100 may serve to decrease a humidity level present in information handling system 100, thereby reducing a corrosion risk associated with increased humidity levels. For example, heater 150 may be activated by corrosion manager 160 to raise the ambient temperature of information handling system 100 such that the humidity level and associated corrosion risk decreases.

In one embodiment, each heater 150 may be disposed proximate to a respective device, or devices, within one or more chassis of information handling system 100. In this embodiment, the respective temperature of each device may be increased on a granular level, such that each device within information handling system 100 may operate at a different operating temperature while contributing to an overall increase in ambient temperature of information handling system 100. In another embodiment, one or more heaters 150 may be disposed proximate to a front, side, rear, and/or top surface, or panel, of information handling system 100. In this embodiment, heaters 150 may increase the ambient temperature of information handling system 100 in a uniform manner. In yet another embodiment, heaters 150 may be disposed, both, proximate to respective devices within information handling system 100 and a front, side, rear, and/or top surface, or panel, of information handling system 100. In other embodiments, heaters 150 may be disposed throughout information handling system 100 and/or computing environment 135 in any combination suitable for increasing an ambient temperature of information handling system 100 and/or computing environment 135.

Each heater 150 of information handling system 100 may be associated with a threshold, or a "heater control threshold," used to designate an ambient temperature at which heater 150 may be activated and/or deactivated. That is, each heater 150 may be activated, or otherwise placed in an on state, in response to the ambient temperature of information handling system 100 decreasing to a given ambient temperature, thus allowing humidity levels to increase and potentially cause corrosion within information handling system 100. Similarly, each heater 150 may be deactivated, or otherwise placed in an off state, in response to the ambient temperature of information handling system 100 increasing to a given ambient temperature, allowing one or more devices of information handling system 100 to become overheated and potentially cause a decreased lifecycle of the one or more devices. In one embodiment, the heater control threshold of heater 150 may be controlled, or otherwise modified, by one or more devices of information handling system 100. For example, corrosion manager 160 may modify the heater control threshold of heater 150 based, in part, on the ambient temperature and humidity level of information handling system 100. In one embodiment, heaters 150 may be or include one or more radiant heaters, convection heaters, resistive heaters, and/or any combination of heaters suitable for increasing an ambient temperature of information handling system 100. Heaters are described in further detail with respect to FIG. 2.

In one embodiment, each fan 155 (collectively referred to herein as "fans 155") may be a suitable system, apparatus, or device operable to cause airflow within information handling system 100 and/or computing environment 135. In particular, fans 155 may be disposed throughout information handling system 100 and/or computing environment 135 such that fans 155 may be activated, or otherwise placed in an on state, to increase and/or decrease an ambient temperature of information handling system 100. Similarly, fans 155 may be deactivated, or otherwise placed in an off state, to increase and/or decrease an ambient temperature of information handling system 100. For example, each fan 155 may be disposed proximate to heater 150, or heaters 150, such that fan 155, when activated, may direct the heat generated by heater 150, or heaters 150, throughout information handling system 100 in one or more air streams to increase the ambient temperature within information handling system 100. In this example, fan 155 may be deactivated to cease directing the heat generated by heater 150, or heaters 150, such that the ambient temperature within information handling system 100 decreases. In another example, each fan 155 may be disposed proximate to, or within, a respective device such that fan 155, when activated, may direct the heat generated by the device away from information handling system 100 in one or more air streams (e.g., exiting through a vent of information handling system 100), thereby preventing the device from becoming overheated and decreasing the ambient temperature within information handling system 100. In this example, fan 155 may be deactivated to cease directing the heat generated by the device away from information handling system 100 such that the ambient temperature within information handling system 100 increases, thereby reducing a corrosion risk associated with increased humidity levels.

Each fan 155 of information handling system 100 may be associated with a threshold, or a "fan speed threshold," used to designate a fan speed at which fan 155 operates. Specifically, a fan speed threshold may designate a rate at which an internal motor of fan 155 operates, thereby causing the internal motor to increase and/or decrease in revolutions per minute (RPMs). In one embodiment, the fan speed threshold of fan 155 may be controlled, or otherwise modified, by one or more devices of information handling system 100. For example, corrosion manager 160 may modify the fan speed threshold of fan 155 based, in part, on the ambient temperature and humidity level of information handling system 100. In addition, a direction of rotation for each fan 155 may be modified, allowing fan 155 to draw surrounding air from computing environment 135 into information handling system 100. In particular, corrosion manager 160 may cause a direction of rotation for each fan 155 disposed throughout information handling system 100 and/or computing environment 135 to reverse in direction, thereby causing the ambient temperature of information handling system 100 to increase. In one embodiment, fan 155 may be or include one or more server rack enclosure fans, rack mount fan trays, case fans, power supply unit (PSU) fans, central processing unit (CPU) fans, hard drive cooling fans, and/or any combination of fans suitable for causing airflow within information handling system 100 and/or computing environment 135.

In one embodiment, corrosion manager 160 may be a suitable system, apparatus, or device operable to reduce corrosion in information handling system 100. Conventionally, fresh air cooling methods used to decrease the ambient temperature of an information handling system may direct an outdoor air stream through the information handling system, thereby cooling the information handling system as the outdoor air stream flows. However, outdoor air streams may carry high levels of humidity, causing water within the outdoor air streams to condense and form multiple layers of water that adhere to various devices within the information handling system. Specifically, outdoor air streams having a high relative humidity (RH) (e.g., greater than 55% RH) may cause multiple monolayers of water to coat the surfaces of various devices (e.g., PCBs, microcontrollers, FPGAs, CPLDs, and the like) within the information handling systems. In polluted environments, the outdoor air streams may additionally carry gaseous pollutants (e.g., $Cl_2$, $H_2S$, $SO_2$, $O_3$, and the like), causing pollutant molecules within the outdoor air streams to become absorbed into the multiple layers of water coating devices within the information handling system. This results in corrosion of the devices over time, which may cause nondeterministic behavior in the devices and eventual failure. Replacing corroded devices may require increased cost and maintenance for users, thereby decreasing user experience and overall system efficiency.

In contrast, corrosion manager 160 may mitigate the increased humidity levels associated with fresh air cooling methods to reduce corrosion in information handling system 100. In particular, corrosion manager 160 may identify an ambient temperature and humidity level (e.g., captured by sensors 145) of information handling system 100 and may then determine a likelihood that corrosion may occur, or a "corrosion risk value," based on the ambient temperature and the humidity level. If the corrosion risk value is greater than a threshold corrosion risk value, corrosion manager 160 may modify one or more device threshold settings (e.g., device threshold settings 245 shown in FIG. 2) to cause the ambient temperature of information handling system 100 to increase. This increase in ambient temperature of information handling system 100 may cause the humidity level to decrease, thereby mitigating the formation of water layers—and pollutant molecules therein—that collect on devices within the information handling system 100. By mitigating increases in humidity levels and reducing corrosion, corrosion manager 160 may increase the lifecycle of information handling system 100, thereby decreasing the cost and maintenance associated with replacing corroded devices while increasing user experience and overall system efficiency. Corrosion manager 160 is described in further detail with respect to FIG. 2.

In one embodiment, management backend 165 may be a suitable system, apparatus, or device operable to provide an interface through which a user may communicate with information handling system 100. Specifically, management backend 165 may be or include an information handling system communicably coupled to information handling system 100 via network 130 such that a user (e.g., an administrator) of management backend 165 may remotely access and monitor physical parameters of information handling system 100 (e.g., power supply voltage, fan speed, humidity, ambient temperature, and the like). In one embodiment, management backend 165 may access one or more devices, buses, and/or portions of information handling system 100. In particular, management backend 165 may access BMC 140 via network 130 to perform a management information exchange with information handling system 100. In one embodiment, the management information exchange may be based at least on an Intelligent Platform Management Interface (IPMI) standard. For example, management backend 165 may permit utilization of IPMI out-of-band interfaces such as IPMI Over LAN (local area network). In another example, the management information exchange may be based on a Redfish standard. In the embodiment illustrated in FIG. 1, management backend 165 includes a user interface 170.

In one embodiment, user interface 170 may be a suitable system, apparatus, or device operable to electronically present information to, and/or receive information from, a user of management backend 165. In particular, user interface 170 may electronically present physical parameters of information handling system 100 (e.g., power supply voltage, fan speed, humidity, ambient temperature, and the like) to a user and/or receive one or more inputs from the user. In one embodiment, user interface 170 may provide a user with power management, virtual media access, and/or remote console capabilities, among others, which may be available via a web browser and/or a command line interface. For example, user interface 170 may allow an administrator one or more abilities to configure and/or maintain information handling system 100 as if the administrator was at a console of information handling system 100 and/or had physical access to information handling system 100.

In one embodiment, user interface 170 may receive a system setting indicating one or more user preferences, or "operation modes," from the user. Each operation mode selected by a user via user interface 170 may cause information handling system 100 to modify, or optimize, a specific mode of operation in accordance with the user preference indicated by the system setting. In particular, a performance-based operation mode, or a "performance" operation mode, may be selected by a user via user interface 170 to increase performance of information handling system 100, and/or the devices therein (e.g., overclocked devices for enhanced speed). Similarly, a power-based operation mode, or a "power" operation mode, may be selected by a user via user interface 170 to decrease power consumption of information handling system 100, and/or the devices therein (e.g., devices operating under low-power and/or standby mode for increased power efficiency). Additionally, a lifecycle-based operation mode, or a "lifetime" operation mode, may be selected by a user via user interface 170 to increase the lifecycle of information handling system 100, and/or the device therein (e.g., maintaining low device temperature to avoid overheating). These operation modes may not be mutually exclusive, or discordant, with respect to one another. That is, each operation mode selected by a user may cause information handling system 100 to modify, or optimize, a specific mode of operation within the confines of other operation modes selected by the user such that operation modes may synergistically achieve the desired user preferences. In one embodiment, respective operation modes may comprise a certain percentage of an overall system setting. For example, a user may specify a performance operation mode of 30%, a power operation mode of 40%, and a lifetime operation mode of 30%. In another embodiment, respective operation modes may be electronically presented to a user via user interface 170 in the form of a 3-axis slider, where each respective operation mode may be represented as an axis of the slider (e.g., slider 300 shown in FIGS. 3A and 3B).

Figure 2:
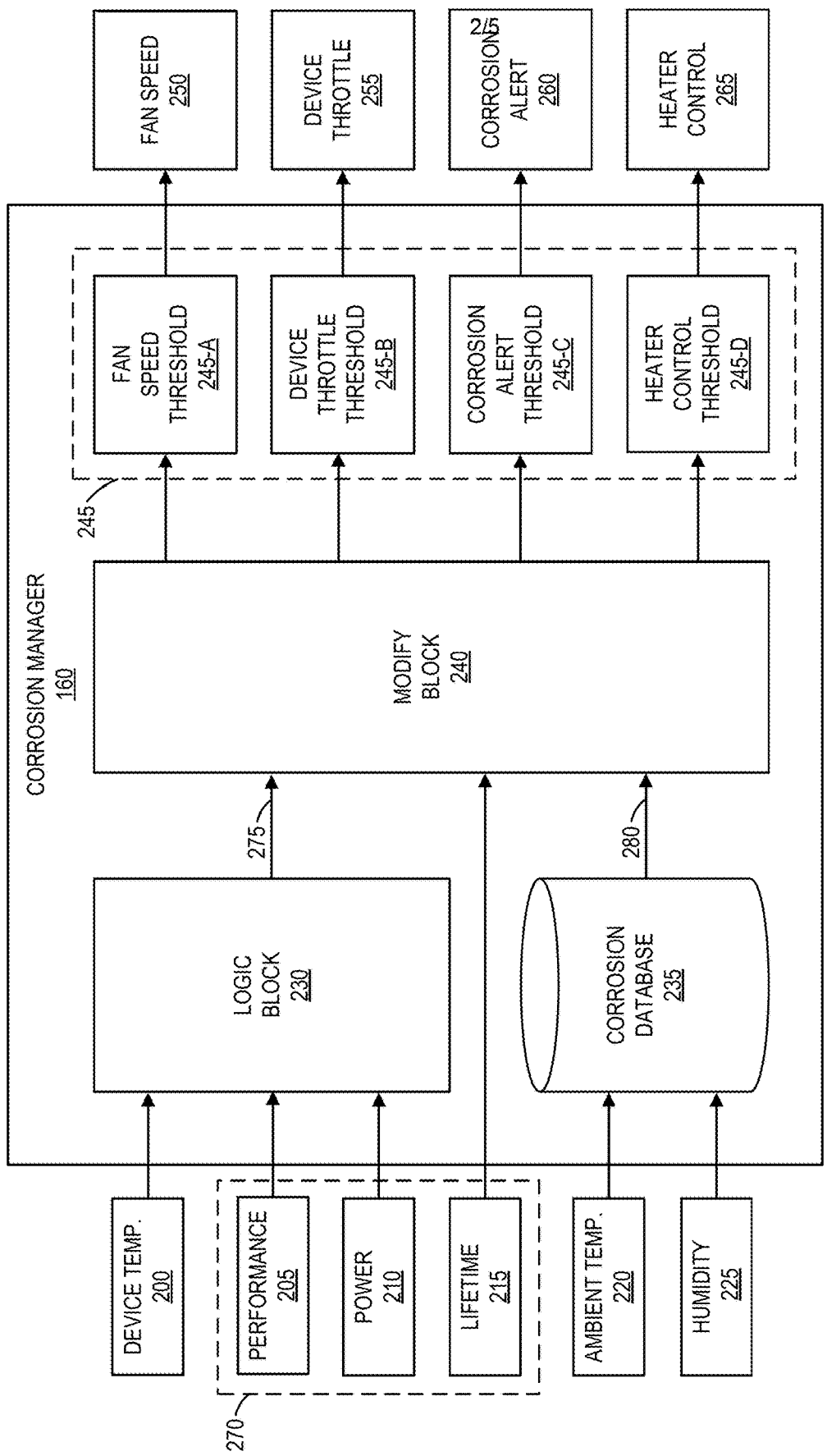
FIG. 2 is a block diagram of selected elements of an embodiment of a corrosion manager of an information handling system.

FIG. 2 is a block diagram of selected elements of an embodiment of a corrosion manager of an information handling system. In the embodiment illustrated in FIG. 2, corrosion manager 160 may receive multiple inputs (e.g., from BMC 140, sensors 145, management backend 165, and the like) and may generate multiple outputs used to increase and/or decrease an ambient temperature of information handling system 100 based on the received inputs. In one embodiment, corrosion manager 160 may generate outputs used to increase the ambient temperature of information handling system 100 and to decrease a humidity level present in information handling system 100, thereby reducing a corrosion risk associated with increased humidity levels as described above with respect to FIG. 1. In another embodiment, corrosion manager 160 may generate outputs used to decrease the ambient temperature of information handling system 100 to avoid overheating that may potentially cause a decreased lifecycle of one or more devices of information handling system 100. In the embodiment illustrated in FIG. 2, corrosion manager 160 includes a logic block 230, a corrosion database 235, a modify block 240, and device threshold settings 245. Device threshold settings 245 include fan speed threshold 245-A, device throttle threshold 245-B, corrosion alert threshold 245-C, and heater control threshold 245-D. Inputs to corrosion manager 160 include device temperature 200, system setting 270, ambient temperature 220, and humidity 225. System setting 270 includes performance 205, power 210, and lifetime 215 operation modes. Outputs from corrosion manager 160 include fan speed 250, device throttle 255, corrosion alert 260, and heater control 265.

In one embodiment, corrosion manager 160 may receive a system setting indicating one or more operation modes. As shown in FIG. 2, corrosion manager 160 may receive system setting 270 that includes performance 205, power 210, and lifetime 215 operation modes. In one embodiment, each operation mode may be selected by a user of management backend 165 and may comprise a certain percentage of an overall system setting 270. For example, a user may specify a performance 205 operation mode of 30%, a power 210 operation mode of 40%, and a lifetime 215 operation mode of 30% via user interface 170 as described above with respect to FIG. 1. In another embodiment, system setting 270 may be autogenerated by one or more devices of information handling system 100 based on the physical parameters of information handling system 100 (e.g., power supply voltage, fan speed, humidity, ambient temperature, and the like). For example, BMC 140 may autogenerate system setting 270 based on environmental information associated with physical parameters of information handling system 100 captured by sensors 145. In the embodiment illustrated in FIG. 2, performance 205 and power 210 operation modes may serve as input into logic block 230 (in addition to device temperature 200) and lifetime 215 operation mode may serve as input in modify block 240.

In one embodiment, logic block 230 may receive device temperature 200, performance 205 operation mode, and power 210 operation mode as inputs. Here, device temperature 200 may indicate an operating temperature of one or more devices (e.g., hard drives, CPU, GPU, and the like) of information handling system 100. For example, sensors 145 may capture a device temperature of a CPU of information handling system 100 (i.e., processor subsystem 105) and may transmit the device temperature to BMC 140. In this example, BMC 140 may monitor the device temperature of the CPU and may provide device temperature 200 to corrosion manager 160 as input into logic block 230. In another example, sensors 145 may transmit the captured device temperature directly to corrosion manager 160 as device temperature 200 input. Once the inputs are received, logic block 230 may perform one or more logical operations using the inputs to generate output 275. Here, output 275 may serve as an input to modify block 240, indicating to modify block 240 ways in which device threshold settings 245 may be modified to remain within a maximum device temperature 200 (e.g., as specified by a manufacturer of the device) in accordance with performance 205 and power 210 operation modes (e.g., as specified by a user).

In one embodiment, corrosion manager 160 may identify an ambient temperature and a humidity level of information handling system 100. As shown in FIG. 2, corrosion manager 160 may receive ambient temperature 220 and humidity 225 as inputs into corrosion database 235. Here, ambient temperature 220 and humidity 225 inputs may indicate the ambient temperature and humidity level, respectively, of information handling system 100. For example, ambient temperature 220 and humidity 225 inputs may indicate the ambient temperature and humidity level captured by sensors 145. In one embodiment, BMC 140 may monitor the ambient temperature and humidity level of information handling system 100 and may provide ambient temperature 220 and humidity 225 to corrosion manager 160 as input into corrosion database 235. In another embodiment, sensors 145 may transmit the captured ambient temperature and humidity level directly to corrosion manager 160 as ambient temperature 220 and humidity 225 inputs.

Once ambient temperature 220 and humidity 225 inputs are received, corrosion manager 160 may identify a corrosion risk value based on the inputs. Specifically, corrosion manager 160 may access corrosion database 235 to identify corrosion risk value 280 based on ambient temperature 220 and humidity 225 inputs. In the embodiment illustrated in FIG. 2, corrosion database 235 may store multiple corrosion risk values corresponding to, and/or comprised of, various ambient temperature and humidity level combinations, or ambient temperature and humidity level pairs. For example, corrosion database 235 may be or include a lookup table (LUT) comprised of respective corrosion risk values corresponding to each ambient temperature and humidity level pair. Corrosion manager 160 may select corrosion risk value 280 from the multiple corrosion risk values stored in corrosion database 235 based on ambient temperature 220 and humidity 225 inputs.

In one embodiment, corrosion risk value 280 may be or include a numeric value indicating a likelihood that corrosion may occur based on ambient temperature 220 and humidity 225 inputs. For example, corrosion risk value 280 may be or include a numeric value ranging from 1 to 10, where a numeric value of 1 may indicate a minimum likelihood that corrosion may occur and a numeric value of 10 may indicate a maximum likelihood that corrosion may occur. In another example, corrosion risk value 280 may be or include a binary value of 0 or 1, where a binary value of 0 may indicate an unlikelihood that corrosion may occur and a binary value of 1 may indicate a likelihood that corrosion may occur. In the embodiment illustrated in FIG. 2, corrosion risk value 280 may serve as an input to modify block 240, indicating to modify block 240 ways in which device threshold settings 245 may be modified in accordance with the likelihood that corrosion may occur. In one embodiment, corrosion manager 160 may determine that corrosion risk value 280 is greater than a threshold corrosion risk value and may modify one or more of device threshold settings 245 to cause the ambient temperature of information handling system 100 to increase, thereby causing the humidity level to decrease. For example, corrosion manager 160 may determine that a numeric corrosion risk value 280 of 6 is greater than a predetermined threshold corrosion risk value of 5 and may decrease heater control threshold 245-D for heater control 265. In this example, decreasing heater control threshold 245-D may cause heat control 265 to activate heaters 150, or otherwise place heaters 150 in an on state, at a lower threshold ambient temperature to increase the ambient temperature of information handling system 100.

In one embodiment, when system setting 270 indicates a performance 205 operation mode, corrosion manager 160 may modify device threshold settings 245 to increase performance of information handling system 100 while causing the ambient temperature of information handling system 100 to increase. In particular, when performance 205 operation mode comprises a percentage of system setting 270, corrosion manager 160 may cause an increase in the performance of one or more devices (e.g., CPU, GPU, and the like) of information handling system 100 which may additionally increase a device temperature of the one or more devices. In this embodiment, modify block 240 of corrosion manager 160 may increase device throttle threshold 245-B of device throttle 255 associated with one or more devices of information handling system 100. Here, device throttle 255 may be used to decrease a frequency, device temperature, and/or power consumption of one or more devices of information handling system 100. For example, increasing device throttle threshold 245-B may cause device throttle 255 for a CPU of information handling system 100 (i.e., processor subsystem 105) to refrain from executing in response to an increased, or overclocked, clock rate and/or increased operating voltage of the CPU. That is, increasing device throttle threshold 245-B may permit the CPU to operate at an increased clock rate and/or operating voltage without using device throttle 255 to decrease the frequency, device temperature, and/or power consumption of the CPU. In this way, increasing device throttle threshold 245-B may cause an increased performance of one or more devices of information handling system 100 that may increase respective device temperatures of the one or more devices causing an overall increase in the ambient temperature of information handling system 100, thereby causing the humidity level to decrease. In addition, modify block 240 may increase heater control threshold 245-D for heater control 265 of heaters 150 (shown in FIG. 1), thereby raising the designated ambient temperature at which heaters 150 may be activated. In doing so, corrosion manager 160 may prevent heaters 150 from becoming activated, or otherwise placed in an on state, to prevent one or more devices from becoming overheated while in performance 205 operation mode.

In one embodiment, when system setting 270 indicates power 210 operation mode, corrosion manager 160 may modify device threshold settings 245 to decrease power consumption of information handling system 100. Specifically, when power 210 operation mode comprises a percentage of system setting 270, corrosion manager 160 may cause a decrease in the power consumption of one or more devices (e.g., CPU, GPU, and the like) of information handling system 100 which may cause a decrease in the device temperature of the one or more devices. In this embodiment, modify block 240 of corrosion manager 160 may decrease device throttle threshold 245-B of device throttle 255 associated with one or more devices of information handling system 100. Decreasing device throttle threshold 245-B may cause device throttle 255 to execute in response to the one or more devices reaching a lower threshold frequency, device temperature, and/or power consumption designated by device throttle threshold 245-B. In addition, modify block 240 may increase fan speed threshold 245-A for fan speed 250 of fans 155 (shown in FIG. 1), thereby raising the designated ambient temperature at which fans 155 may be activated. Similarly, modify block 240 may increase heater control threshold 245-D for heater control 265 of heaters 150 (shown in FIG. 1), thus raising the designated ambient temperature at which heaters 150 may be activated. In doing so, corrosion manager 160 may prevent fans 155 and/or heaters 150 from becoming activated, or otherwise placed in an on state, to further decrease power consumption of information handling system 100 while in performance 205 operation mode. However, this decrease in power consumption of one or more devices may cause a decrease in the overall ambient temperature of information handling system 100, which may allow humidity levels and associated corrosion risk to increase. Therefore, modify block 240 may additionally decrease corrosion alert threshold 245-C, causing corrosion manager 160 to send a signal indicating that the humidity level is above a threshold humidity level (e.g., designated by corrosion alert threshold 245-C) if the humidity level increases to that associated with corrosion risk (e.g., greater than 55% RH). In particular, corrosion manager 160 may send corrosion alert 260 to management backend 165 indicating that the humidity level of information handling system 100 is above a threshold humidity level designated by corrosion alert threshold 245-C.

In one embodiment, if system setting 270 indicates lifetime 215 operation mode, corrosion manager 160 may modify device threshold settings 245 to increase the lifecycle of information handling system 100 while causing the ambient temperature of information handling system 100 to increase. In particular, when lifetime 215 operation mode comprises a percentage of system setting 270, corrosion manager 160 may cause an increase in the lifecycle of one or more devices (e.g., CPU, GPU, and the like) of information handling system 100. In this embodiment, modify block 240 of corrosion manager 160 may decrease device throttle threshold 245-B of device throttle 255 associated with one or more devices of information handling system 100. Decreasing device throttle threshold 245-B may cause device throttle 255 to execute in response to the one or more devices reaching a lower threshold frequency, device temperature, and/or power consumption, thereby extending the lifecycle of the one or more devices by preventing excess wear and/or overheating. In addition, modify block 240 may decrease fan speed threshold 245-A for fan speed 250 of fans 155 (shown in FIG. 1), thereby lowering the designated ambient temperature at which fans 155 may be activated. Similarly, modify block 240 may decrease heater control threshold 245-D for heater control 265 of heaters 150 (shown in FIG. 1), thus lowering the designated ambient temperature at which heaters 150 may be activated. In doing so, corrosion manager 160 may allow fans 155 and heaters 150 to be activated, or otherwise placed in an on state, at lower ambient temperatures to decrease a humidity level present in information handling system 100, thereby reducing a corrosion risk associated with increased humidity levels. For example, fans 155 and heaters 150 may be activated by corrosion manager 160 to raise the ambient temperature of information handling system 100 such that the humidity level and associated corrosion risk decreases. Modify block 240 may additionally, or alternatively, cause a direction of rotation for fans 155 to reverse in direction, thereby causing the ambient temperature of information handling system 100 to increase. In addition, modify block 240 may decrease corrosion alert threshold 245-C, causing corrosion manager 160 to send a signal indicating that the humidity level is above a threshold humidity level (e.g., designated by corrosion alert threshold 245-C) if the humidity level increases to that associated with corrosion risk (e.g., greater than 55% RH).

Figure 3A:
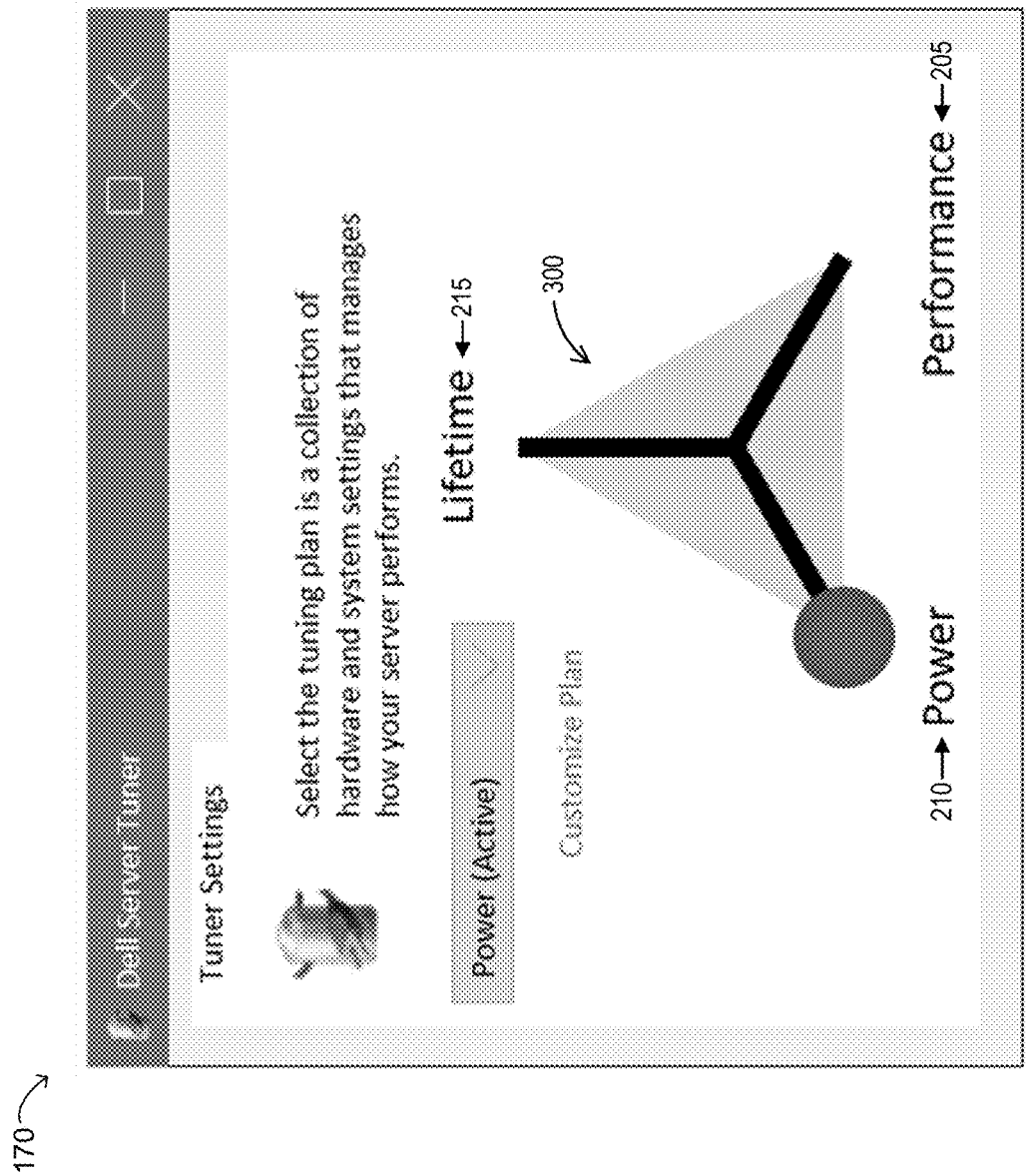
FIGS. 3A and 3B illustrate selected elements of an embodiment of a user interface of a management backend.
Figure 3B:
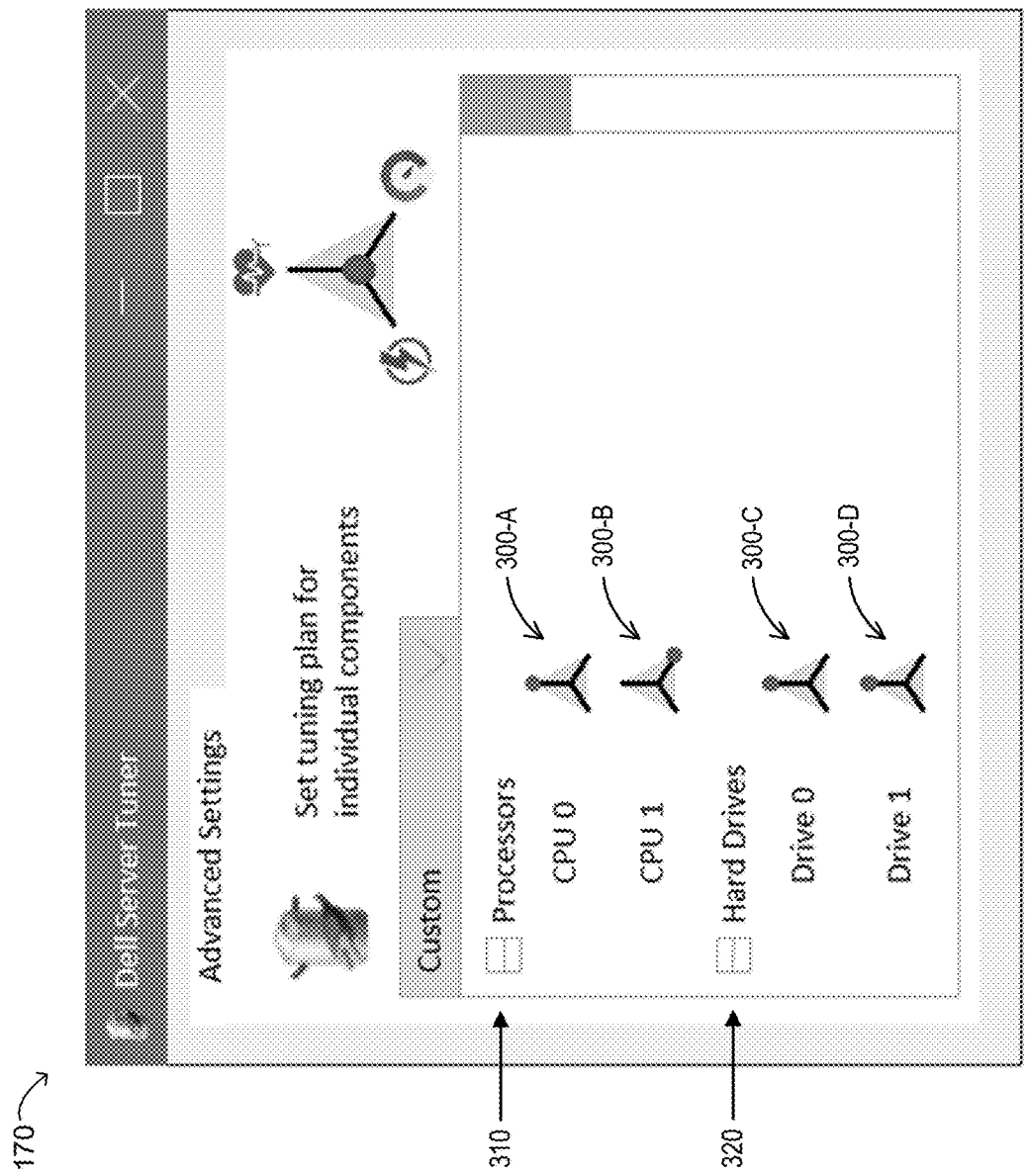

FIGS. 3A and 3B illustrate selected elements of an embodiment of a user interface of a management backend. In the embodiment illustrated in FIGS. 3A and 3B, user interface 170 may be electronically presented to a user of management backend 165 (shown in FIG. 1). Within user interface 170, a user may specify a system setting 270 (shown in FIG. 2) for information handling system 100 by accessing slider 300 and selecting one or more operation modes. In particular, a user may slide slider 300 along one of three axes, where each axis corresponds to a respective operation mode (i.e., performance 205, power 210, and lifetime 215 operation modes). In one embodiment, a system setting may be applied to information handling system 100 globally. For example, a user may access user interface 170 illustrated in FIG. 3A to specify a system setting for the entire information handling system 100. In another embodiment, multiple system settings may be applied to information handling system 100 locally for each device and/or portion of information handling system 100. For example, a user may access user interface 170 illustrated in FIG. 3B to specify a system setting for respective processors 310 and hard drives 320 of information handling system 100. In the example illustrated in FIG. 3B, processors 310 include CPU 0 and CPU 1. Here, a user may specify a system setting for CPU 0 by accessing slider 300-A and may similarly specify a different system setting for CPU 1 by accessing slider 300-B. The user may additionally specify a system setting for hard drives 320 via user interface 170. In particular, the user may specify a system setting for Drive 0 by accessing slider 300-C and may additionally specify a different system setting for Drive 1 by accessing slider 300-D. In this way, user interface 170 provides users with an intuitive, comprehensive interface for specifying, both, global and/or local system settings for information handling system 100.

Figure 4:
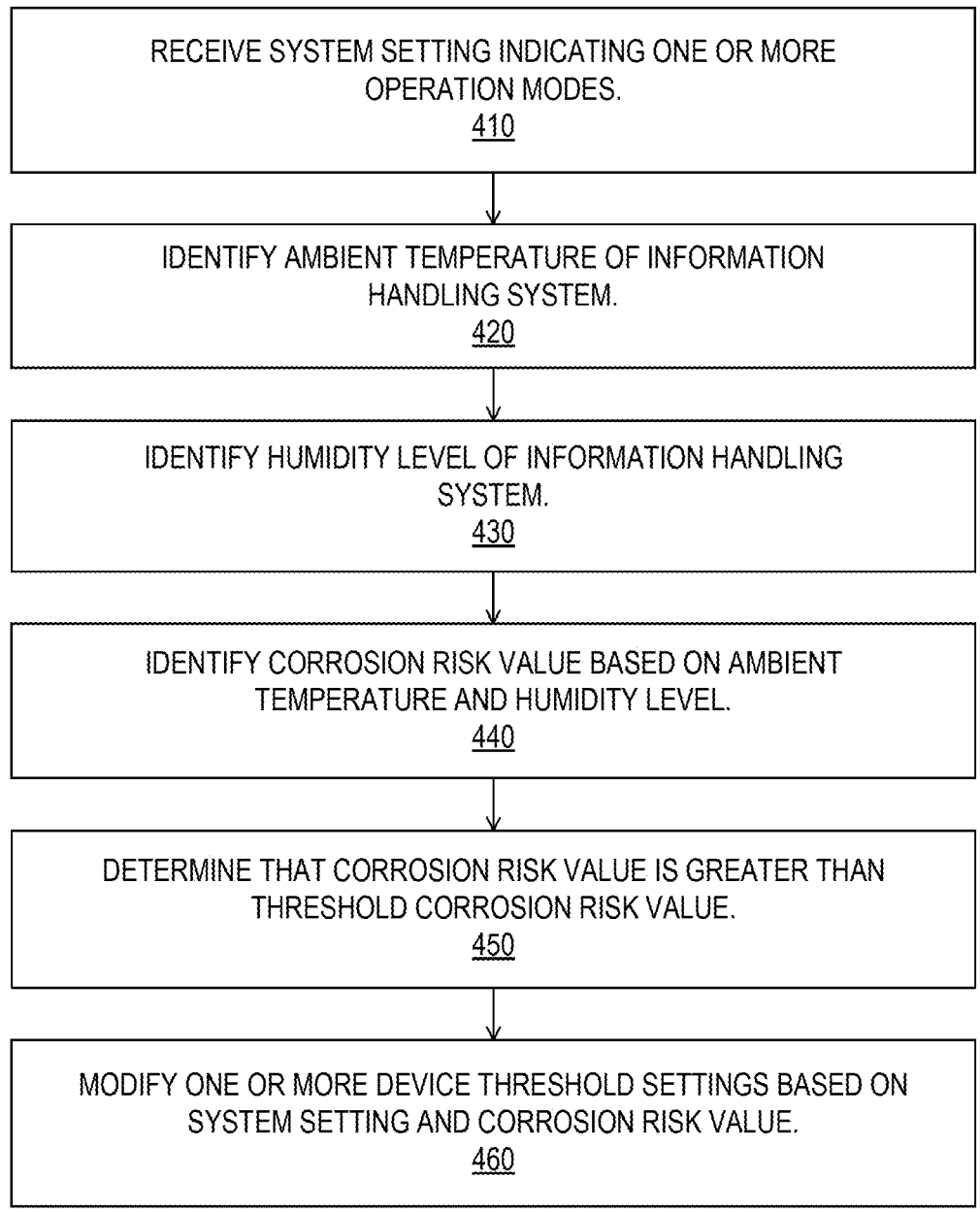
FIG. 4 is a flowchart depicting selected elements of an embodiment of a method for reducing corrosion in an information handling system.

FIG. 4 is a flowchart depicting selected elements of an embodiment of a method for reducing corrosion in an information handling system. It is noted that certain operations described in method 400 may be optional or may be rearranged in different embodiments.

Method 400 may begin at step 410, where a corrosion manager of the information handling system may receive a system setting indicating one or more operation modes. For example, corrosion manager 160 may receive system setting 270 comprised of performance 205, power 210, and/or lifetime 215 operation modes as described above with respect to FIG. 2. In steps 420 and 430, the corrosion manager may identify an ambient temperature and a humidity level of the information handling system. The ambient temperature and the humidity level may be captured by one or more sensors of the information handling system. For example, corrosion manager 160 may receive ambient temperature 220 and humidity 225 as input as shown in FIG. 2. Ambient temperature 220 and humidity 225 inputs may indicate the ambient temperature and humidity level captured by sensors 145 shown in FIG. 1. In step 440, the corrosion manager may identify a corrosion risk value based on the ambient temperature and the humidity level. For example, corrosion manager 160 may access corrosion database 235 to identify corrosion risk value 280 based on ambient temperature 220 and humidity 225 inputs as described above with respect to FIG. 2. In steps 450 and 460, the corrosion manager may determine that the corrosion risk value is greater than a threshold corrosion risk value and may modify one or more device threshold settings based on the system setting and the corrosion risk value. Modifying the one or more device threshold settings may cause the ambient temperature of the information handling system to increase and the humidity level to decrease. For example, corrosion manager 160 may determine that a numeric corrosion risk value 280 of 6 is greater than a predetermined threshold corrosion risk value of 5 and may decrease heater control threshold 245-D for heater control 265 as described above with respect to FIG. 2. In this example, decreasing heater control threshold 245-D may cause heater control 265 to activate heaters 150, or otherwise place heaters 150 in an on state, at a lower threshold ambient temperature to increase the ambient temperature of information handling system 100, thereby decreasing the humidity level and associated corrosion risk.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for reducing corrosion in an information handling system, the method comprising;
   receiving, by a corrosion manager of the information handling system, a system setting indicating a first operation mode of one or more operation modes;
   decreasing, based on the first operation mode, a device throttle threshold associated with one or more devices of the information handling system;
   throttling, based on the device throttle threshold, the one or more devices;
   in response to the throttling:
      identifying, by the corrosion manager, an ambient temperature of the information handling system, the ambient temperature captured by one or more sensors of the information handling system;
      identifying, by the corrosion manager, a humidity level of the information handling system, the humidity level captured by the one or more sensors;
      identifying, by the corrosion manager, a corrosion risk value based on the ambient temperature and the humidity level;
      determining, by the corrosion manager, that the corrosion risk value is greater than a threshold corrosion risk value; and
      in response to determining that the corrosion risk value is greater than the threshold corrosion risk value:
         modifying, by the corrosion manager, one or more device threshold settings based on the system setting and the corrosion risk value, including:
         decreasing a fan speed threshold of a fan, and
         decreasing a heater control threshold of a heater, wherein modifying the one or more device threshold settings causes the ambient temperature to increase and the humidity level to decrease;
         activating, based on the fan speed threshold, the fan; and
         activating, based on the heater control threshold, the heater.

2. The method of claim 1, wherein identifying the corrosion risk value based on the ambient temperature and the humidity level comprises:
   accessing, by the corrosion manager, a corrosion database storing a plurality of corrosion risk values, each of the plurality of corrosion risk values comprised of an ambient temperature and humidity level pair; and
   selecting, by the corrosion manager, the corrosion risk value from the plurality of corrosion risk values based on the ambient temperature and the humidity level.

3. The method of claim 1, wherein modifying the one or more device threshold settings based on the system setting and the corrosion risk value comprises:
   causing, by the corrosion manager, the fan speed threshold to decrease, the decreased fan speed threshold causing a fan speed of one or more fans of the information handling system to increase.

4. The method of claim 3, further comprising:
causing, by the corrosion manager, a direction of rotation for each of the one or more fans to reverse in direction.

5. The method of claim 1, wherein
the decreased increased device throttle threshold causes an operating temperature of the one or more devices of the information handling system to decrease.

6. The method of claim 1, wherein modifying the one or more device threshold settings based on the system setting and the corrosion risk value comprises:
causing, by the corrosion manager, the heater control threshold to decrease, the decreased heater control threshold causing a temperature of a heater of the information handling system to increase.

7. The method of claim 1, wherein the one or more operation modes includes:
a performance operation mode configured to increase a performance of the information handling system;
a power operation mode configured to decrease a power consumption of the information handling system; and
a lifetime operation mode configured to increase a life-cycle of the information handling system.

8. The method of claim 1, wherein the system setting indicating one or more operation modes is received from a management backend via a network, the management backend including a user interface configured to receive the one or more operation modes from a user of the management backend.

9. The method of claim 8, further comprising:
sending, by the corrosion manager, a signal to the management backend via the network, the signal indicating that the humidity level is above the threshold humidity level.

10. One or more computer-readable non-transitory storage media embodying software that is operable when executed to:
receive, by a corrosion manager of an information handling system, a system setting indicating one or more operation modes;
decrease, based on the first operation mode, a device throttle threshold associated with one or more devices of the information handling system;
throttle, based on the device throttle threshold, the one or more devices;
in response to the throttling
identify, by the corrosion manager, an ambient temperature of the information handling system, the ambient temperature captured by one or more sensors of the information handling system;
identify, by the corrosion manager, a humidity level of the information handling system, the humidity level captured by the one or more sensors;
identify, by the corrosion manager, a corrosion risk value based on the ambient temperature and the humidity level;
determine, by the corrosion manager, that the corrosion risk value is greater than a threshold corrosion risk value; and
in response to determining that the corrosion risk value is greater than the threshold corrosion risk value:
modify, by the corrosion manager, one or more device threshold settings based on the system setting and the corrosion risk value, including:
decrease a fan speed threshold of a fan, and
decrease a heater control threshold of a heater,
wherein modifying the one or more device threshold settings causes the ambient temperature to increase and the humidity level to decrease;
activating, based on the fan speed threshold, the fan; and
activating, based on the heater control threshold, the heater.

11. The media of claim 10, wherein to identify the corrosion risk value based on the ambient temperature and the humidity level, the software is further operable when executed to:
access, by the corrosion manager, a corrosion database storing a plurality of corrosion risk values, each of the plurality of corrosion risk values comprised of an ambient temperature and humidity level pair; and
select, by the corrosion manager, the corrosion risk value from the plurality of corrosion risk values based on the ambient temperature and the humidity level.

12. The media of claim 10, wherein to modify the one or more device threshold settings based on the system setting and the corrosion risk value, the software is further operable when executed to:
cause, by the corrosion manager, the fan speed threshold to decrease, the decreased fan speed threshold causing a fan speed of one or more fans of the information handling system to increase.

13. The media of claim 12, wherein the software is further operable when executed to:
cause, by the corrosion manager, a direction of rotation for each of the one or more fans to reverse in direction.

14. The media of claim 10, wherein
the decreased device throttle threshold causes an operating temperature of the one or more devices of the information handling system to decrease.

15. The media of claim 10, wherein to modify the one or more device threshold settings based on the system setting and the corrosion risk value, the software is further operable when executed to:
cause, by the corrosion manager, the heater control threshold to decrease, the decreased heater control threshold causing a temperature of a heater of the information handling system to increase.

16. The media of claim 10, wherein the one or more operation modes includes:
a performance operation mode configured to increase a performance of the information handling system;
a power operation mode configured to decrease a power consumption of the information handling system; and
a lifetime operation mode configured to increase a life-cycle of the information handling system.

17. The media of claim 10, wherein the system setting indicating one or more operation modes is received from a management backend via a network, the management backend including a user interface configured to receive the one or more operation modes from a user of the management backend.

18. The media of claim 17, wherein the software is further operable when executed to:
send, by the corrosion manager, a signal to the management backend via the network, the signal indicating that the humidity level is above the threshold humidity level.

19. A computing environment, comprising:
an information handling system including one or more processors; and
one or more computer-readable non-transitory storage media coupled to one or more of the processors and comprising instructions operable when executed by one or more of the processors to cause the system to:
receive, by a corrosion manager of the information handling system, a system setting indicating one or more operation modes;
decrease, based on the first operation mode, a device throttle threshold associated with one or more devices of the information handling system throttle, based on the device throttle threshold, the one or more devices;
in response to the throttling:
  identify, by the corrosion manager, an ambient temperature of the information handling system, the ambient temperature captured by one or more sensors of the information handling system;
  identify, by the corrosion manager, a humidity level of the information handling system, the humidity level captured by the one or more sensors;
  identify, by the corrosion manager, a corrosion risk value based on the ambient temperature and the humidity level;
  determine, by the corrosion manager, that the corrosion risk value is greater than a threshold corrosion risk value; and
  in response to determining that the corrosion risk value is greater than the threshold corrosion risk value:
    modify, by the corrosion manager, one or more device threshold settings based on the system setting and the corrosion risk value, including:
      decrease a fan speed threshold of a fan, and
      decrease a heater control threshold of a heater, wherein modifying the one or more device threshold settings causes the ambient temperature to increase and the humidity level to decrease;
    activating, based on the fan speed threshold, the fan; and
    activating, based on the heater control threshold, the heater.

20. The computing environment of claim 19, wherein to identify the corrosion risk value based on the ambient temperature and the humidity level, the processors are further operable when executed to:
access, by the corrosion manager, a corrosion database storing a plurality of corrosion risk values, each of the plurality of corrosion risk values comprised of an ambient temperature and humidity level pair; and
select, by the corrosion manager, the corrosion risk value from the plurality of corrosion risk values based on the ambient temperature and the humidity level.

* * * * *